US012632535B2

(12) United States Patent
Chunduru Venkata et al.

(10) Patent No.: US 12,632,535 B2
(45) Date of Patent: May 19, 2026

(54) SYSTEMS AND METHODS FOR A PLATFORM AS A SERVICE ORCHESTRATOR

(71) Applicant: Verizon Patent and Licensing Inc., Basking Ridge, NJ (US)

(72) Inventors: Sivanaga Ravi Kumar Chunduru Venkata, Irving, TX (US); Kelly M. Paone, Chester, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 106 days.

(21) Appl. No.: 18/441,308

(22) Filed: Feb. 14, 2024

(65) Prior Publication Data

US 2025/0258905 A1     Aug. 14, 2025

(51) Int. Cl.
*G06F 21/00*          (2013.01)
*G06F 21/53*          (2013.01)

(52) U.S. Cl.
CPC ........ *G06F 21/53* (2013.01); *G06F 2221/033* (2013.01)

(58) Field of Classification Search
CPC ........................... G06F 21/53; G06F 2221/033
See application file for complete search history.

(56) References Cited

U.S. PATENT DOCUMENTS

| | | | |
|---|---|---|---|
| 2020/0082071 A1* | 3/2020 | Cherry | G06F 21/604 |
| 2021/0096895 A1* | 4/2021 | Reid | H04L 63/0428 |
| 2021/0173929 A1* | 6/2021 | Dalvi | G06F 21/564 |
| 2024/0098100 A1* | 3/2024 | Lal | H04L 63/1441 |
| 2024/0119140 A1* | 4/2024 | Crabtree | G06F 21/566 |
| 2024/0256242 A1* | 8/2024 | Goyer | G06F 11/3604 |

* cited by examiner

*Primary Examiner* — Ghazal B Shehni

(57) ABSTRACT

In some implementations, a platform as a service (PaaS) orchestrator may receive a set of values for a set of parameters of a software component template for a software component. The PaaS orchestrator may generate the software component using the set of values for the set of parameters. The PaaS orchestrator may execute the software component in a sandbox environment. The PaaS orchestrator may validate the software component for deployment. The PaaS orchestrator may deploy the software component in a deployment environment of the PaaS orchestrator. The PaaS orchestrator may detect a network event relating to the deployment environment. The PaaS orchestrator may identify a network management action associated with the network event. The PaaS orchestrator may one or more instructions to cause the network management action to be performed.

20 Claims, 7 Drawing Sheets

400

410 Receive a set of values for a set of parameters of a software component template for a software component 420 Generate the software component using the set of values for the set of parameters 430 Execute the software component in a sandbox environment 440 Validate the software component for deployment 450 Deploy the software component in a deployment environment 460 Detect a network event relating to the deployment environment 470 Identify a network management action associated with the network event and based on the logic for the set of workflows of the software component 480 Transmit one or more instructions to cause the network management action to be performed

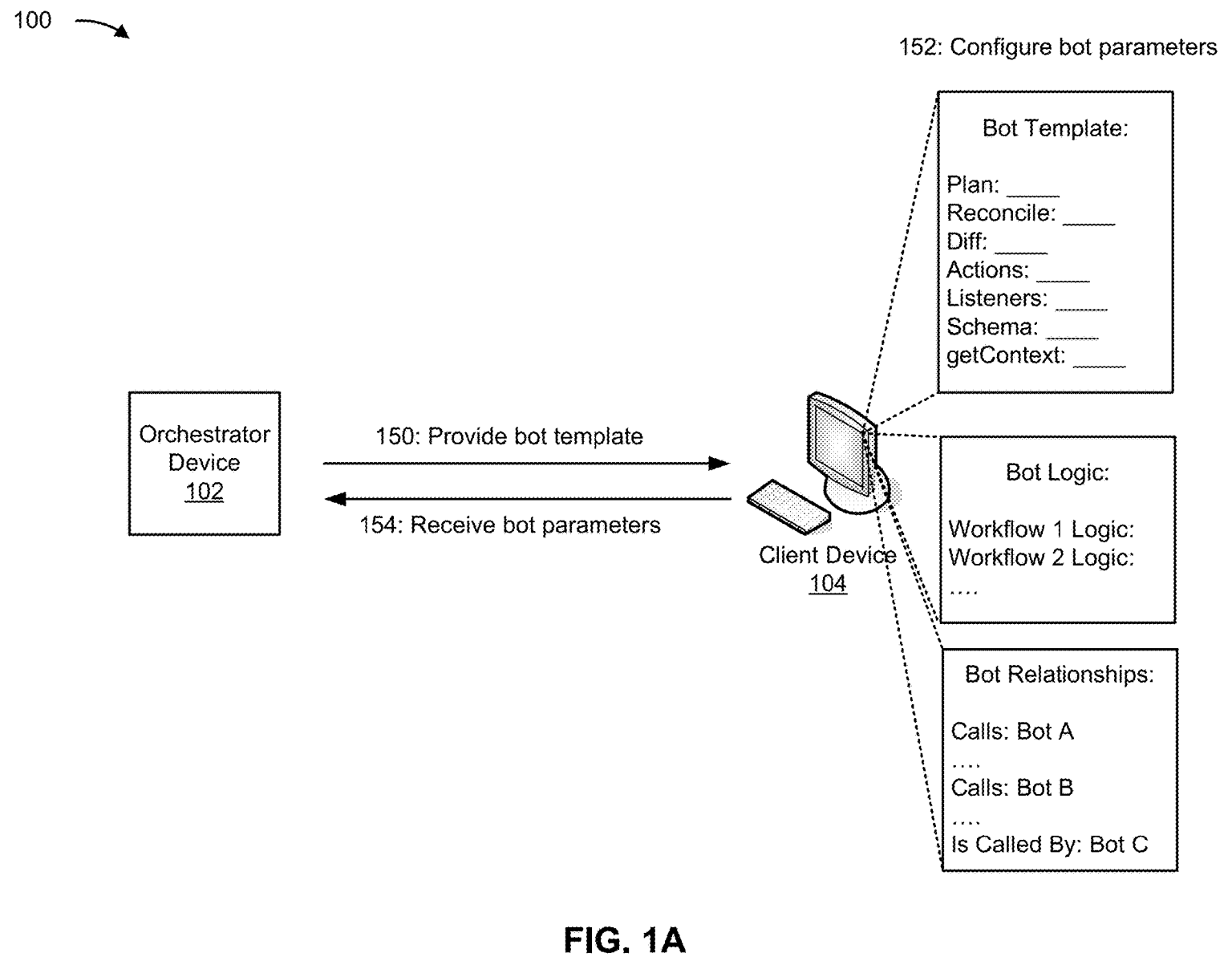

100

152: Configure bot parameters

Bot Template:

Plan: ___
Reconcile: ___
Diff: ___
Actions: ___
Listeners: ___
Schema: ___
getContext: ___

Bot Logic:

Workflow 1 Logic: ___
Workflow 2 Logic: ___
...

Bot Relationships:

Calls: Bot A
...
Calls: Bot B
...
Is Called By: Bot C

Client Device
104

150: Provide bot template

154: Receive bot parameters

Orchestrator
Device
102

FIG. 1A

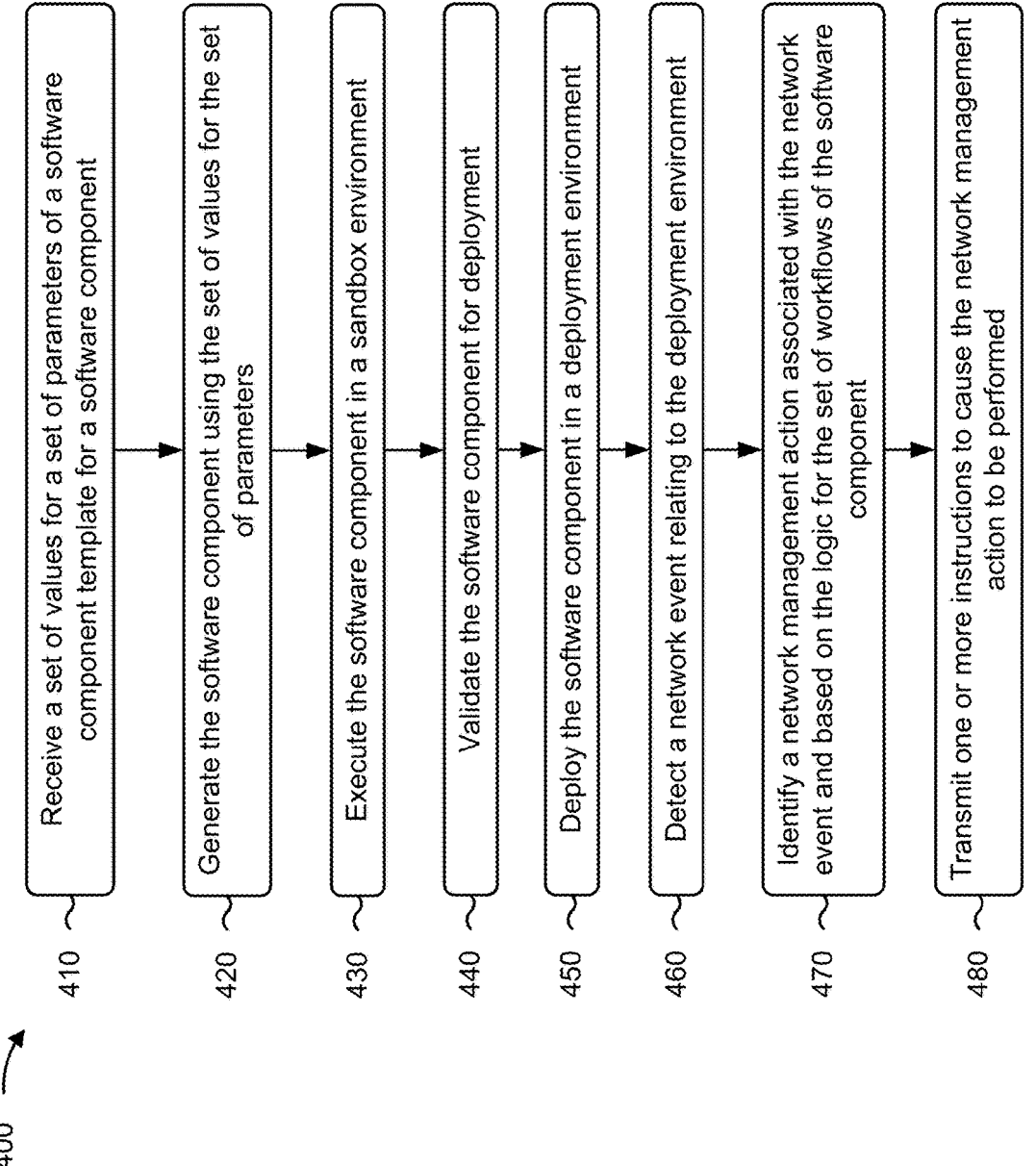

400

410 Receive a set of values for a set of parameters of a software component template for a software component 420 Generate the software component using the set of values for the set of parameters 430 Execute the software component in a sandbox environment 440 Validate the software component for deployment 450 Deploy the software component in a deployment environment 460 Detect a network event relating to the deployment environment 470 Identify a network management action associated with the network event and based on the logic for the set of workflows of the software component 480 Transmit one or more instructions to cause the network management action to be performed

FIG. 4

SYSTEMS AND METHODS FOR A PLATFORM AS A SERVICE ORCHESTRATOR

BACKGROUND

A platform as a service (PaaS) may include an environment, such as a cloud environment, that provides services and/or resources for a developer to create, test, execute, and manage an application. For example, a PaaS deployment may include cloud infrastructure that provides physical resources, cloud software that provides virtual resources, or cloud interfaces that provide access to the cloud infrastructure and cloud software. For example, a PaaS may provide a user interface with which a user can access a cloud environment and execute software components in the cloud environment.

BRIEF DESCRIPTION OF THE DRAWINGS

FIGS. 1A-1D are diagrams of an example associated with providing a platform as a service for a telecommunications network.

FIG. 4 is a flowchart of an example process associated with a PaaS orchestrator.

DETAILED DESCRIPTION OF EXAMPLE EMBODIMENTS

Figure 1B:
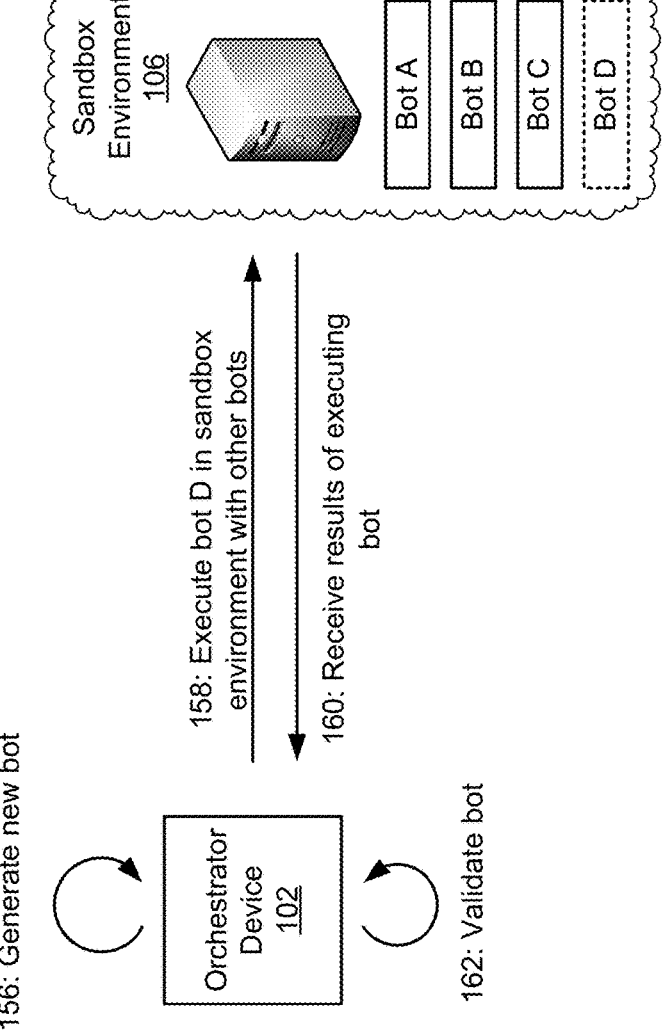

The following detailed description of example implementations refers to the accompanying drawings. The same reference numbers in different drawings may identify the same or similar elements.

Networks, such as telecommunications networks, may include user-facing elements, such as a user equipment (UE), back-end elements, such as core network elements, and intermediate elements, such as network nodes, that provide the user-facing elements with access to the back-end elements. A network may allocate resources to a set of UEs and provide network services for the set of UEs, such as communications services, data services, location services, network-provided applications, or other services. Some networks may have multiple networks nested within a single network. For example, a telecommunications network may have multiple radio access networks (RANs) using multiple radio access technologies (RATs). Further, the telecommunications network may include a set of elements external to the RANs of the telecommunications network, such as application servers, cloud networks, or other types of networks that interface with the telecommunications network to provide services to users of the telecommunications network.

Accordingly, to provide network services, a network may link applications, software components, data structures, or other resources of multiple domains. For example, a set of application servers may provide data that is served, via the network, to a set of UEs. As one example, an application server may provide multimedia content to a RAN, which transmits the multimedia content to a set of UEs for display to a set of users. Similarly, a set of UEs may provide data to an application server. As one example, in a machine-type communications (MTC) deployment, a set of smart parking monitors may provide data indicating whether a set of parking spaces are being used to an application server, which may provide a smart display with information identifying a quantity of available parking spaces for display to drivers entering a garage.

Different entities may deploy different software components to interact with other software components within a network. For example, a first entity that provides a RAN may deploy a first set of software components to manage the RAN, a second entity that provides an application to UEs may deploy a second set of software components to obtain information from and/or provide information to the RAN, or a third entity that provides a physical infrastructure associated with the RAN may deploy a third set of software applications to provide status information regarding the physical infrastructure to the first entity or the second entity. As network deployments become increasingly complex, the interactions between the software components can become increasingly complex, which may result in unexpected errors. Such errors may result in poor network management, such as resulting in an inefficient allocation of network resources to different UEs for receiving different network services. Similarly, as networks become increasingly complex, it may become increasingly difficult to deploy applications to a network. For example, large-scale networks may have data volumes that require software components to be associated with large amounts of physical resources that application developers cannot efficiently provide.

Platform as a service (PaaS), software as a service (SaaS), and infrastructure as a service (IaaS) are cloud computing service models that offer layers of abstraction to enable network providers to optimize resource management, scalability, and service delivery. IaaS provides virtualized computing resources, such as storage, networking, and processing resources, to allow application providers to scale infrastructure dynamically. SaaS provides ready-to-use software applications over a network, thereby reducing a burden of software maintenance for software providers. PaaS provides a platform with development tools, middleware, and runtime environments, thereby streamlining a creation and deployment of applications, and may include elements of the IaaS and SaaS models. However, networks may have unique requirements, such as latency requirements, bandwidth requirements, scalability requirements, compliance requirements, interoperability requirements, security requirements, and network function requirements. A PaaS platform may lack a device to incorporate these requirements into a process for authoring, testing, deploying, and operating an application on a telecommunications network.

Some implementations described herein provide an orchestrator device (e.g., a network orchestrator device or a PaaS orchestrator device) for multi-domain orchestration. For example, the orchestrator device may provide a builder functionality to facilitate the building, testing, and validation of software components, such as bots, that are configured to interact within a network, such as a telecommunications network, and optimize the network. In some implementations, the orchestrator device may automate lifecycle management for software components by managing instances of software components that are running within a network, such as a telecommunications network, among other examples. In some implementations, the orchestrator device may use the software components deployed in a PaaS platform to automatically detect network events, determine network management actions, and cause the network management actions to be performed to optimize a network.

As a result, by providing an orchestrator device for a network, such as a telecommunications network, software components can be deployed on the network more rapidly, with a reduced likelihood of errors relative to other software deployment processes. By deploying software components to a network more rapidly, network functionality can be improved and network performance can be optimized. Additionally, or alternatively, by enforcing a set of requirements, of a network, at the orchestrator device, the orchestrator device can ensure that the set of requirements are satisfied for the network, thereby ensuring a configured level of performance for UEs operating in the network.

FIGS. 1A-1D are diagrams of an example 100 associated with providing a platform as a service for a network, such as a telecommunications network among other examples. As shown in FIGS. 1A-1D, example 100 includes an orchestrator device 102, a client device 104, a sandbox environment 106, a deployment environment 108, and a network 110 that includes a set of elements 112 (e.g., one or more devices, such as one or more UEs 114, one or more network nodes 116, or one or more core network entities 118).

As shown in FIG. 1A, and by reference number 150, the orchestrator device 102 may provide a bot template. A bot may include a software component that is configured to automate a particular set of tasks or processes, such as within a network infrastructure. For example, a bot may include a software component that performs operations relating to routine maintenance, monitoring, traffic optimization, fault detection, or network provisioning. A bot template may include a preconfigured, reusable framework or blueprint that is a foundation or structured starting point for developing a bot with a set of capabilities and that is compliant with one or more network requirements. The bot template may include one or more fields for receiving or selecting parameters or functions relating to defining a task for the bot, selecting data interfaces for the bot, configuring a logic for the bot, configuring error handling for the bot, configuring security functions for the bot, and/or configuring resource scaling for the bot.

As further shown in FIG. 1A, and by reference number 152, the client device 104 may provide the bot template for display and configure a set of bot parameters. For example, the client device 104 may receive a set of user selections, via the user interface, associated with configuring a set of parameters for a bot. In some implementations, the client device 104 may receive information specifying a set of workflows (e.g., runtime operations) and/or an associated logic for the bot. For example, the client device 104 may receive information identifying a workflow for performing a task and an associated logic for the workflow. In some implementations, the logic may include one or more algorithms, such as a decision-making algorithm, for progressing through the workflow. In some implementations, the logic may include a machine learning model. For example, the client device 104 may select an existing machine learning model or may train a new machine learning model for the bot. In the case of training a new machine learning model, the orchestrator device 102 may provide a dataset relating to a network to enable training of the new machine learning model. In some implementations, the client device 104 may configure a set of relationships for the bot. For example, the client device 104 may configure a set of other software components, such as other bots, or data structures with which a new bot is to interface or communicate.

As further shown in FIG. 1A, and by reference number 154, the orchestrator device 102 may receive a set of bot parameters. For example, the orchestrator device 102 may receive information identifying a set of values for the set of parameters of a new bot. As shown in FIG. 1B by reference number 156, the orchestrator device 102 may generate the new bot based on the set of bot parameters. For example, the orchestrator device 102 may generate program code including a set of code segments corresponding to the set of parameters. As an example, when a parameter indicates a particular interface, the orchestrator device 102 may identify a code segment for the particular interface and may include the code segment in a program code of the new bot. In some implementations, the orchestrator device 102 may use a code template for the new bot. For example, the orchestrator device 102 may include a repository of code segments and select one or more code segments for the new bot. Additionally, or alternatively, the orchestrator device 102 may use a code generation tool to generate code based on the one or more parameters or a natural language description of the new bot (e.g., a natural language description of the new bot's functionality). For example, the orchestrator device 102 may use a large language model (LLM) to generate program code for the new bot. In this case, the LLM may be trained on code of other bots operating in the network 110 and/or one or more requirements of the network 110 to ensure that generated code is compatible and/or satisfies the one or more requirements of the network 110.

As one example of a bot, the orchestrator device 102 may receive information identifying a bot associated with managing operations of a manufacturing line. In this case, the orchestrator device 102 may receive information identifying interfaces with a set of connected cameras (e.g., for receiving motion tracking or object recognition information), with a customer application (e.g., a software component for ordering new materials for the manufacturing line), and with an application server (e.g., an application server for identifying and validating labels or parts on the manufacturing line).

As further shown in FIG. 1B, and by reference number 158, the orchestrator device 102 may execute a sandbox instance of the new bot in the sandbox environment 106. For example, the orchestrator device 102 may cause program code of the new bot to be instantiated with resources of the sandbox environment 106 and executed in the sandbox environment 106. In some implementations, the orchestrator device 102 may cause the sandbox environment 106 to include one or software components of the deployment environment 108. For example, the orchestrator device 102 may set up the sandbox environment 106 to have sandbox instances of one or more elements 112 of the network 110 and/or one or more bots of the deployment environment 108, to test the new bot's interactions with the elements 112 and the one or more other bots. In some implementations, the orchestrator device 102 may cause a set of test cases to be executed. For example, the orchestrator device 102 may generate test data or test events and evaluate the new bot with respect to the test data or test events. As shown by reference numbers 160 and 162, the orchestrator device 102 may receive results of executing the new bot in the sandbox environment 106 and may validate the new bot. For example, the orchestrator device 102 may determine that the new bot is operating in a configured manner (e.g., without throwing unexpected errors or causing a negative impact to a sandbox instance of the network 110).

Figure 1C:
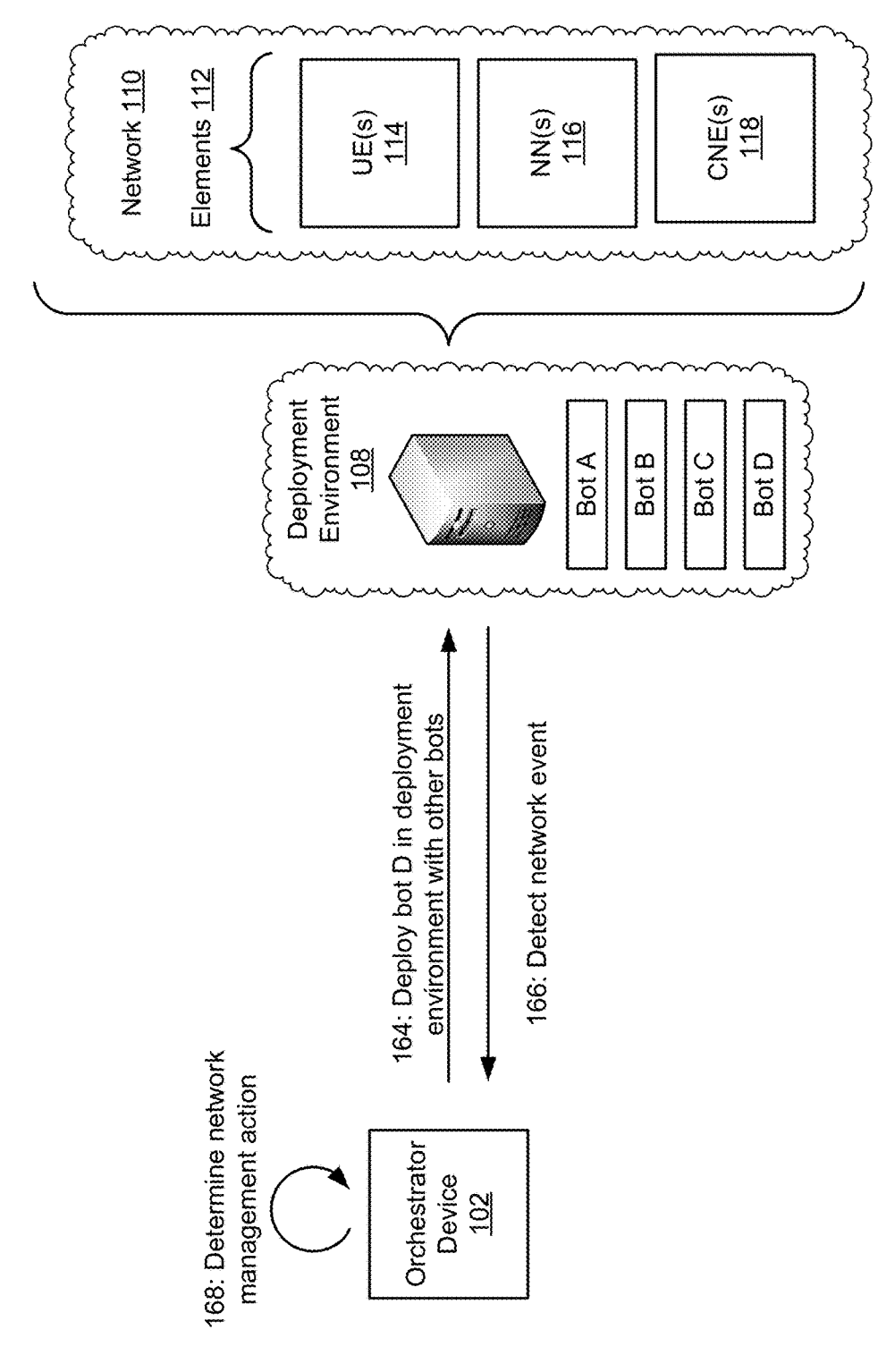

As shown in FIG. 1C, and by reference number 164, the orchestrator device 102 may deploy the new bot in a deployment environment with other bots. For example, the orchestrator device 102 may assign or allocate one or more resources of the deployment environment 108 to instantiate a deployment instance of the new bot in the deployment environment 108. In some implementations, the orchestrator device 102 may monitor deployment of the new bot in the deployment environment 108. For example, the orchestrator device 102 may monitor resource utilization, operation, or messages (e.g., between the new bot and other bots).

In some implementations, the orchestrator device 102 may perform version control procedures on the new bot. For example, the orchestrator device 102 may store information identifying a version of the bot and, when the orchestrator device 102 receives information identifying a new version of the bot, the orchestrator device 102 may automatically update the bot. For example, the orchestrator device 102 may validate a new version of the bot, determine one or more actions associated with removing an old version of the bot, and may deploy the new version of the bot in the deployment environment 108. The one or more actions associated with removing the old version of the bot may include stopping one or more processes that the old bot is performing, identifying a new address for other bots to use to access the new version of the bot, or another action.

As further shown in FIG. 1C, and by reference number 166, the orchestrator device 102 may detect a network event. For example, the orchestrator device 102 may detect a request in the network 110, a new element 112 in the network 110, a disruption with the network 110 (e.g., a service disruption or an infrastructure disruption), or another type of event. In this case, the orchestrator device 102 may detect the event using the new bot. For example, the bot may communicate with one or more other bots or receive data from one or more data sources, and may detect the event using a logic of the bot. In this case, the logic may detect the event based on a threshold being satisfied, based on a rule being followed, or based on an output of a machine learning algorithm, among other examples.

In some implementations, the orchestrator device 102 may determine an event based on monitoring a state of an element 112 of the network 110. For example, the orchestrator device 102 may use the new bot to determine whether a current state of the element 112 matches a configured state of the element 112. In this case, when the current state of the element 112 does not match the configured state of the element 112, the orchestrator device 102 may determine that an event has occurred. The state of the element 112 may include a location, a type, or a subscription, among other examples, as described herein. In some implementations, the orchestrator device 102 may determine the event based on monitoring for the event directly. Additionally, or alternatively, a bot, that is deployed on a system (e.g., a cloud computing platform), for which the orchestrator device 102 is deployed as an orchestrator, may determine the event based on monitoring for the event directly. In this case, the bot may notify the orchestrator device 102 of the event (e.g., the orchestrator device 102 may monitor for the event indirectly using the bot).

In some implementations, the orchestrator device 102 may monitor (directly or indirectly) one or more communications across multiple domains to detect the event using the new bot. For example, the orchestrator device 102 may use the new bot to monitor a network controller domain, an application server domain, a set of different RAN generation domains, or other domains. A domain may include one or more networks 110 or elements 112 that operate thereon. For example, the network 110 may include a first network (e.g., a telecommunications network), a second network (e.g., a network of a cloud computing environment), a third network (e.g., an telecommunications provider's internal network), or a fourth network (e.g., an application provider's internal network). In this case, the orchestrator device 102 may use the bot (and one or more other bots) to interact with one or more elements 112 operating on the one or more networks 110. For example, the orchestrator device 102 may use the bot (and the one or more other bots) to determine a status of resources, communications, users, or devices of the one or more networks 110.

Returning to the example of a bot for managing a manufacturing line, the orchestrator device 102 may, using the bot, receive camera information associated with performing a scan and identifying an operator on the manufacturing line approaching a product bin. The bot may route the camera information to the application server, which may identify and validate labels on the product bin. The application server may indicate that the bin is a last available bin of a particular product and may return an alert to the bot that the bin is the last available bin. The bot may communicate with a customer application to request that additional bins of the particular product be moved to the manufacturing line (e.g., via an automatic item movement system). In this case, each notification that is received by the bot may be characterized as an event for which the bot uses a logic to determine a network management action, such as transmitting information to another software component. By providing a bot as an interface between different devices or software components connected using the network 110, the orchestrator device 102 may enforce one or more policies and avoid errors from incompatibility.

As further shown in FIG. 1C, and by reference number 168, the orchestrator device 102 may determine a network management action. For example, the orchestrator device 102 may use the new bot to determine a network management action. In other words, the orchestrator device 102 may determine the network management action directly or may receive information identifying the network management action based on the bot determining the network management action. For example, the bot may process a detect event and execute an action, which may include transmitting instructions to one or more components being handled by the bot or one or more other bots (e.g., which may each handle one or more components). In some implementations, a bot may generate an event (e.g., which triggers a configured action) or transmit a remote command for an action to occur in another domain (e.g., on a telecommunications network).

The network management action may include a monitoring action (e.g., start monitoring an element 112), a diagnostic action (e.g., identify a source of a fault), a fault correction action (e.g., change a setting to correct a fault), a security enforcement action (e.g., block a network traffic source), a traffic optimization action (e.g., balance a load between a set of routes), a configuration management action (e.g., change a network policy), a resource allocation action (e.g., allocate resources to a channel), a quality of service (QoS) action (e.g., set a particular QoS level), a network slice management action (e.g., add, remove, or modify a network slice or other logical division of a network), or a reporting action (e.g., transmit reporting information), among other examples. In some implementations, the orchestrator device 102 may determine a network management action relating to using a self-organizing network (SON) functionality. For example, the orchestrator device 102 may, based on detecting an event using the bot, cause a network node 116 to use one or more SON functionalities to optimize one or more parameters of the network 110.

As one example, the orchestrator device 102 may determine to adjust a bandwidth that is provided to a UE 114 based on an event detected using the bot. Additionally, or alternatively, the orchestrator device 102 may determine to alter a configuration of a cloud computing environment or the network 110 based on an event detected using the bot. Additionally, or alternatively, the orchestrator device 102 may adjust or apply one or more policies based on an event. For example, when a UE 114 is detected, by the bot, to have traveled from a first geographic area with a first security policy to a second geographic area with a second security policy, the orchestrator device 102 may use the bot to automatically re-provision the UE 114 for the second security policy (e.g., by updating one or more network nodes 116 or core network entities 118 with the second security policy. Additionally, or alternatively, the orchestrator device 102 may update a billing policy, a service policy, or a prioritization policy when the UE 114 is detected, by the bot, to have traveled to a different area (e.g., and the bot is configured to manage area-based policies).

Additionally, or alternatively, the bot may be configured to manage a type-based policy or a subscription-based policy. In the example of a type-based policy, the orchestrator device 102 may automatically apply a first security policy to a first type of UE 114 that connects to the network 110 and a second type of security policy to a second type of UE 114 that connects to the network 110. In the example of a subscription-based policy, the orchestrator device 102 may automatically apply the first security policy to a UE 114 when the UE 114 has a first service subscription and may switch to applying the second security policy when the UE 114 has a second service subscription.

In this way, the orchestrator device 102 may adjust a configured state of the UE 114 (e.g., which security policy is configured for the UE 114) to match a current state of the UE 114 (e.g., the location in which the UE 114 is operating). In another example, the orchestrator device 102 may alter the current state of the UE 114 to match a configured state of the UE 114. For example, the orchestrator device 102 may alter a set of capabilities of the UE 114 to match a configuration of the UE 114. As a particular example, when the UE 114 is configured to have a first bandwidth, but has been allocated a second bandwidth, the orchestrator device 102 may alter the second bandwidth to match the configured first bandwidth.

Figure 1D:
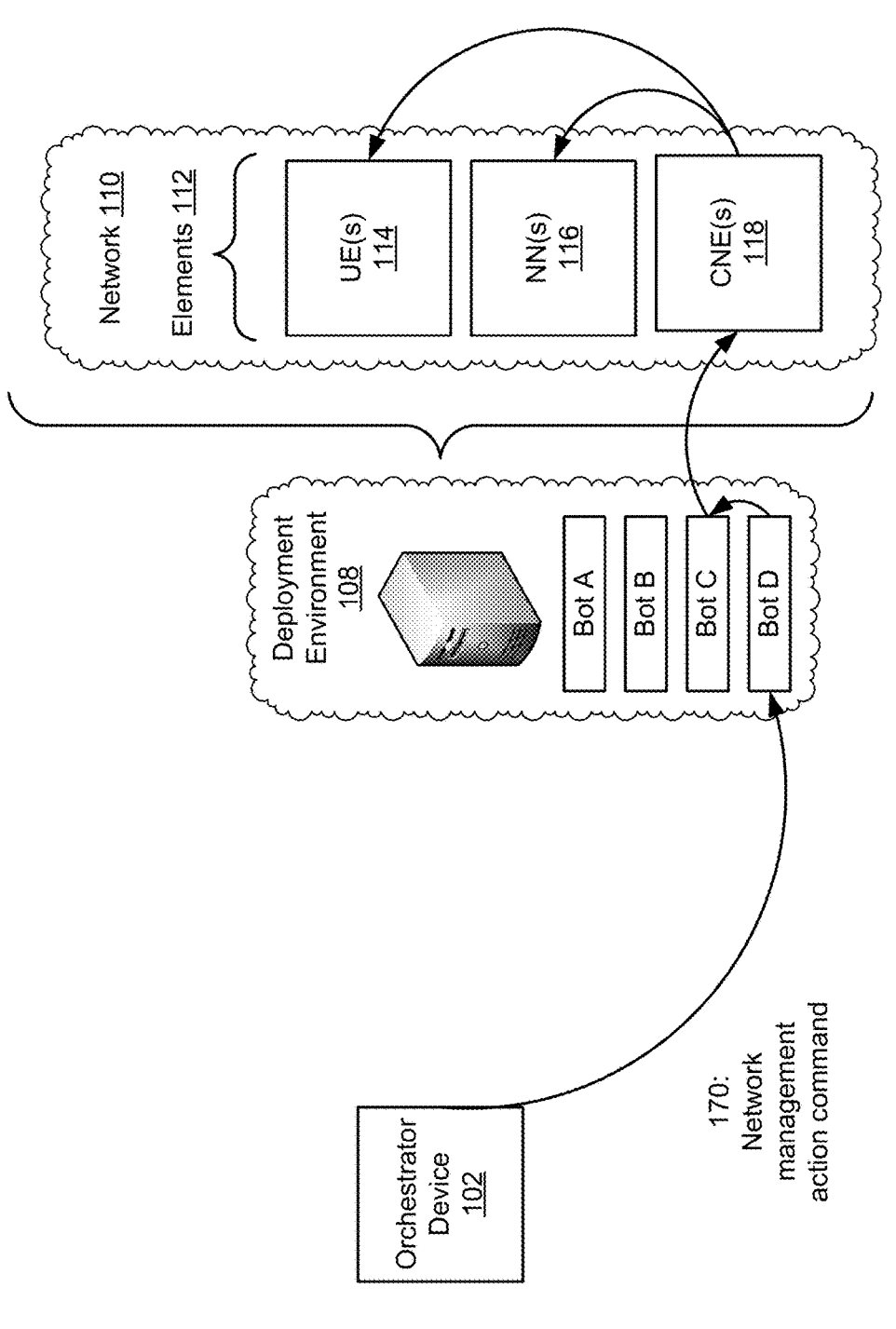

In some implementations, the orchestrator device 102 may determine the network management action using logic of the new bot. For example, the orchestrator device 102 may use the logic of the new bot to determine a network management action that corresponds to the network event. As shown in FIG. 1D by reference number 170, the orchestrator device 102 may use the new bot to cause the network management action to be performed. For example, the new bot may transmit an instruction to another bot and cause the other bot to perform the network management action. Additionally, or alternatively, the orchestrator device 102 may use the new bot to communicate with an element 112 to cause the element to perform an action. For example, the new bot may transmit a command to cause a UE 114, a network node 116, or a core network entity 118 to change a parameter, a prioritization, a resource allocation, a current state, a configured state, or another setting. In this case, the orchestrator device 102 may cause the new bot to transmit one or more alerts or other types of notifications to, for example, the UE 114 to cause the UE 114 to, for example, change the parameter. Additionally, or alternatively, the orchestrator device 102 may transmit alerts to one or more client devices 104. For example, the orchestrator device 102 may transmit one or more alerts identifying the event, the network management action, a status of the new bot, or another message.

In some implementations, the orchestrator device 102 may store information in a log. For example, the orchestrator device 102 may store information identifying the event or the network management action in a log for the new bot. In this case, the orchestrator device 102 may use the log as a dataset for re-training a machine learning model associated with the new bot (e.g., a machine learning model that is being used as a logic for the new bot).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
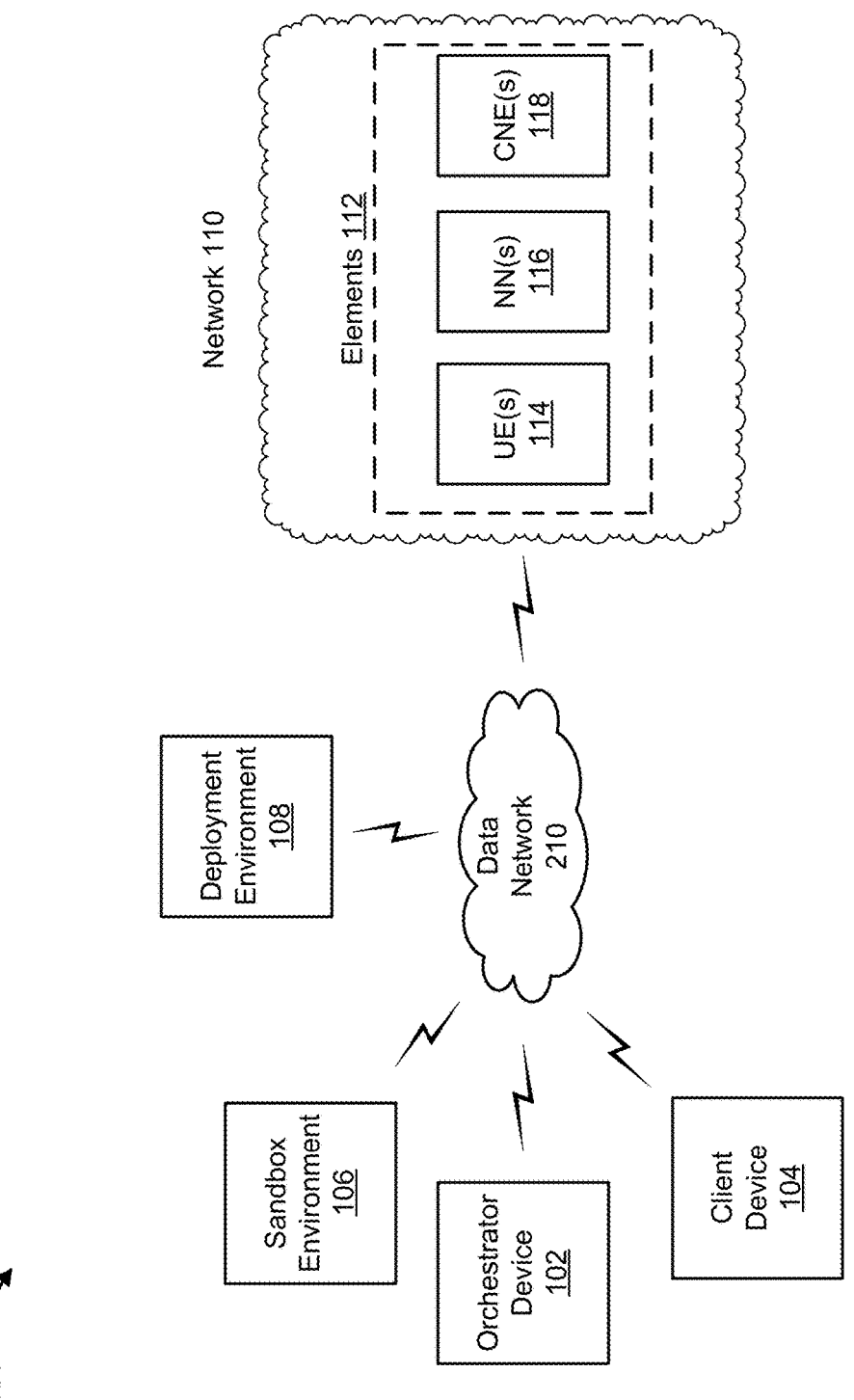
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an orchestrator device 102, a client device 104, a sandbox environment 106, a deployment environment 108, a set of network elements (e.g., elements 112, one or more network nodes 116, or one or more core network entities 118), one or more UEs 114, a network 110, and a data network 210. Devices of environment 200 may interconnect via wired connections, wireless connections, or a combination of wired and wireless connections.

The orchestrator device 102 may include one or more devices capable of receiving, generating, storing, processing, providing, and/or routing information associated with providing a platform as a service, as described elsewhere herein. The orchestrator device 102 may include a communication device and/or a computing device. For example, the orchestrator device 102 may include a PaaS orchestrator device or network orchestrator device that is executed on or includes a server, such as an application server, a client server, a web server, a database server, a host server, a proxy server, a virtual server (e.g., executing on computing hardware), or a server in a cloud computing system. In some implementations, the orchestrator device 102 may include computing hardware used in a cloud computing environment.

In some implementations, the orchestrator device 102 is configured to route or channel a set of network events or remote commands. For example, the orchestrator device 102 may have a set of deployed bots, may receive event notifications or commands, and may securely route the event notifications or commands to other bots or components in different domains (e.g., on different networks). By serving as an intermediate device between the different domains, the orchestrator device 102 may improve security relative to each bot or component having permission to transmit instructions, commands, or notifications each other bot or component on each domain (of a set of domains) directly.

In some implementations, the orchestrator device 102 may include a function of a PaaS platform. For example, a PaaS platform, on which the orchestrator device 102 operates, may include a platform that provides application onboarding, application management, and application execution. In some implementations, the PaaS platform, on which the orchestrator device 102 operates, may include a set of components or functions. For example, the PaaS platform may include a service designer function that enables generation of a software component, such as a bot, using the orchestrator device 102. In this case, the service designer function may provide a user interface (or one or more user interface elements) associated with receiving one or more parameters for a bot. The one or more parameters may be received in a structured format, such as code, or an unstructured format, such as natural language. Additionally, or alternatively, the PaaS platform may include a service onboarding function that enables application onboarding and generation of a service model. For example, the PaaS platform may, using the orchestrator device 102, test and validate a new software component, such as a new bot. Additionally, or alternatively, the PaaS platform may include a workflow management function. For example, the PaaS platform, using the orchestrator device 102, may extend workflows to support solution artifacts that include different services. In other words, the PaaS platform may enable a bot to execute one or more processes that include communication with different platforms or entities associated with the network 110. Additionally, or alternatively, the PaaS platform may include a provisioning or orchestration engine. For example, the orchestrator device 102 may use network intelligence (e.g., SON or machine learning (ML) functionalities) to deploy, update, control, or use infrastructure and associated bots.

The client device 104 may include one or more devices capable of receiving, generating, storing, processing, and/or providing information associated with creating, modifying, using, or operating a software component, such as a bot, as described elsewhere herein. The client device 104 may include a communication device and/or a computing device. For example, the client device 104 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The sandbox environment 106 may include one or more devices capable of receiving, generating, storing, processing, providing, and/or routing information associated with executing one or more sandbox instances of one or more software components, as described elsewhere herein. For example, the sandbox environment 106 may execute and test one or more sandbox instances of one or more bots. The sandbox environment 106 may include a communication device and/or a computing device. For example, the sandbox environment 106 may include a server, such as an application server, a client server, a web server, a database server, a host server, a proxy server, a virtual server (e.g., executing on computing hardware), or a server in a cloud computing system. In some implementations, the sandbox environment 106 may include computing hardware used in a cloud computing environment.

The deployment environment 108 may include one or more devices capable of receiving, generating, storing, processing, providing, and/or routing information associated with executing one or more software components, such as one or more bots, as described elsewhere herein. The deployment environment 108 may include a communication device and/or a computing device. For example, the deployment environment 108 may include a server, such as an application server, a client server, a web server, a database server, a host server, a proxy server, a virtual server (e.g., executing on computing hardware), or a server in a cloud computing system. In some implementations, the deployment environment 108 may include computing hardware used in a cloud computing environment.

The data network 210 may include one or more wired and/or wireless networks. For example, the data network 210 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The data network 210 enables communication among the devices of environment 200.

The network 110 may include one or more wired and/or wireless networks. For example, the network 110 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 110 enables communication among the devices of environment 200.

In some implementations, the network 110 may include one or more elements 112, such as one or more UEs 114, one or more network nodes 116, or one or more core network entities 118. For example, an element 112 of the network 110 may include one or more devices capable of receiving, generating, storing, processing, and/or providing information associated with a telecommunications network, such as the network 110. The UE 114 may include a wireless communication device, a mobile phone, a user equipment, or a similar type of device. A network node 116 may include an access device, such as a base station, a gNodeB (gNB), an access point, or another type of access device. A core network entity 118 may include one or more devices or functions of the network 110, such as access and mobility management function (AMF), a policy control function (PCF), a user plane function (UPF), a network exposure function (NEF), or any other type of device or function of the network 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
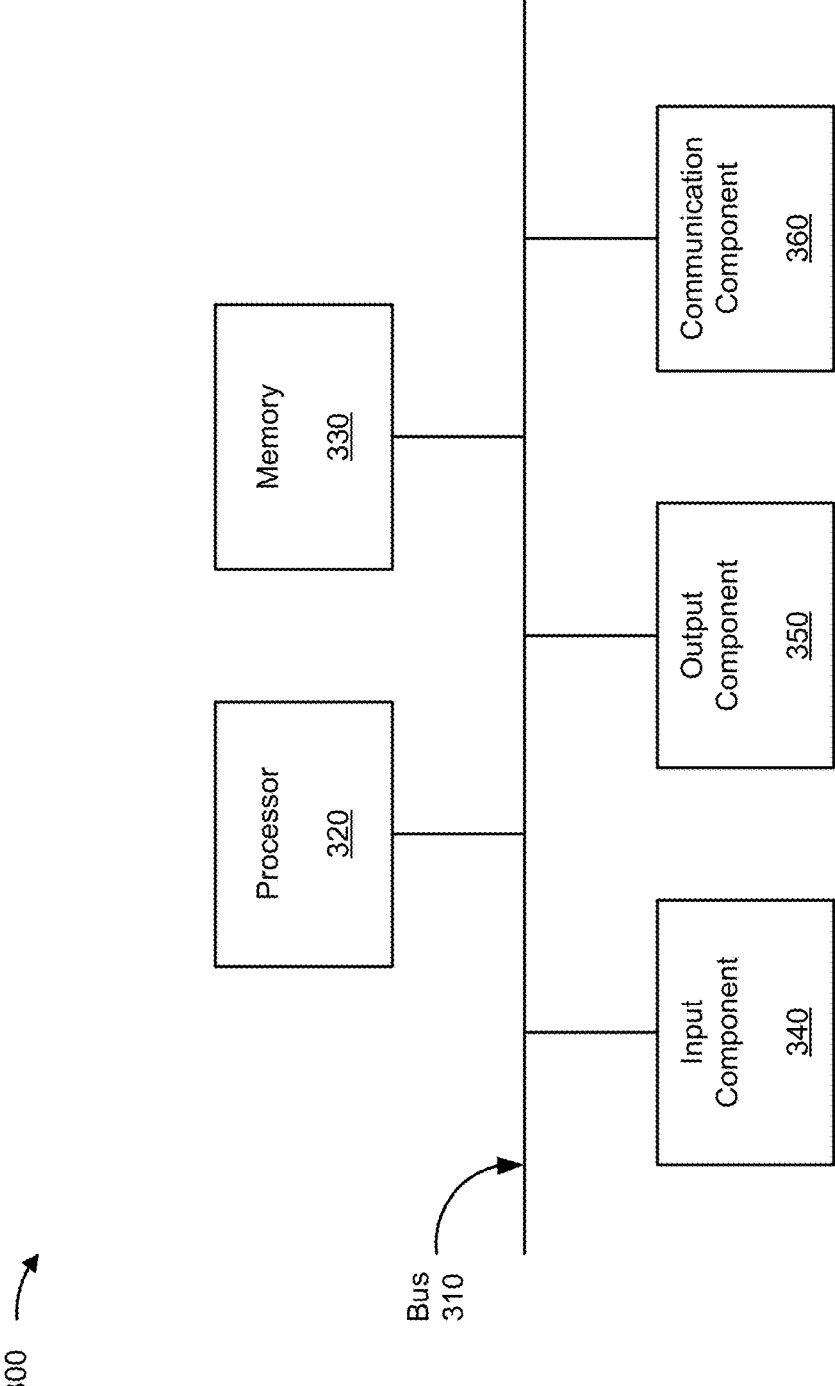
FIG. 3 is a diagram of example components of a device associated with providing a PaaS.

FIG. 3 is a diagram of example components of a device 300 associated with providing a PaaS. The device 300 may correspond to the orchestrator device 102, the client device 104, the sandbox environment 106, the deployment environment 108, and/or a network element (e.g., the elements 112, such as a UE 114, a network node 116, or a core network entity 118). In some implementations, the orchestrator device 102, the client device 104, the sandbox environment 106, the deployment environment 108, and/or the network element (e.g., the elements 112, such as a UE 114, a network node 116, or a core network entity 118) may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with a PaaS orchestrator. In some implementations, one or more process blocks of FIG. 4 may be performed by an orchestrator device (e.g., orchestrator device 102). In some implementations, one or more process blocks of FIG. 4 may be performed by another device or a group of devices separate from or including the orchestrator device, such as a client device (e.g., the client device 104), a sandbox environment (e.g., the sandbox environment 106), a deployment environment (e.g., the deployment environment 108), and/or a network element (e.g., the elements 112, such as the UEs 114, the network nodes 116, or the core network entities 118). Additionally, or alternatively, a platform or system may include one or more components that perform the one or more process blocks of FIG. 4. For example, a cloud computing platform may deploy the orchestrator device and a set of bots to perform the one or more process blocks of FIG. 4. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving a set of values for a set of parameters of a software component template for a software component (block 410). For example, the orchestrator device may receive a set of values for a set of parameters of a software component template for a software component, as described above. In some implementations, the set of values may include a set of functions, a logic for a set of workflows, or relationship information for one or more interactions with one or more other software components, among other examples. In one example, the orchestrator device may receive information identifying a set of interfaces with which a bot is to communicate.

As further shown in FIG. 4, process 400 may include generating the software component using the set of values for the set of parameters (block 420). For example, the orchestrator device may generate the software component using the set of values for the set of parameters, as described above. In one example, the orchestrator device may generate code for a bot to communicate with a set of interfaces.

As further shown in FIG. 4, process 400 may include executing the software component in a sandbox environment (block 430). For example, the orchestrator device may execute the software component in a sandbox environment, as described above. In some implementations, the sandbox environment may include a sandbox instance of the one or more other software components, as described above. In one example, the orchestrator device may create an instance of a bot in a sandbox with one or more other bots and may execute test cases on the bot to determine a behavior of the bot.

As further shown in FIG. 4, process 400 may include validating the software component for deployment (block 440). For example, the orchestrator device may, based on executing the software component in the sandbox environment, validate the software component for deployment, as described above. In one example, the orchestrator device may determine that a bot successfully completes a workflow using a logic of the bot.

As further shown in FIG. 4, process 400 may include deploying the software component in a deployment environment (block 450). For example, the orchestrator device may, based on validating the software component, deploy the software component in a deployment environment of the orchestrator device, as described above. In one example, the orchestrator device may allocate resources to instantiate a bot in a deployment environment for interacting with a telecommunications network.

As further shown in FIG. 4, process 400 may include detecting a network event relating to the deployment environment (block 460). For example, the orchestrator device may, based on deploying the software component, use the software component to detect a network event relating to the deployment environment, as described above. In some implementations, detecting the network event includes identifying a configured state of an element of a network, detecting a current state of the element of the network, and determining that the current state of the element differs from the configured state of the element. In one example, the orchestrator device may determine that a current state of an element of a network does not match a configured state of the element of the network. For example, the orchestrator device may determine that a UE has changed locations from a first location in which the UE is provisioned to a new location in which the UE is not provisioned.

As further shown in FIG. 4, process 400 may include identifying a network management action associated with the network event (block 470). For example, the orchestrator device may use the software component to identify a network management action associated with the network event, as described above. In some implementations, the orchestrator device may identify the network management action based on the logic for the set of workflows of the software component. In one example, the orchestrator device may alter a configuration of an element of a network to cause a current state of the element to match a configured state of the element. For example, the orchestrator device may re-provision the UE for a new location.

As further shown in FIG. 4, process 400 may include transmitting one or more instructions to cause the network management action to be performed (block 480). For example, the orchestrator device may, based on identifying the network management action, transmit one or more instructions to cause the network management action to be performed, as described above. In some implementations, transmitting the one or more instructions comprises transmitting the one or more instructions to alter the current state of the element to cause the current state of the element to correspond to the configured state of the element. In some implementations, transmitting the one or more instructions includes transmitting the one or more instructions to alter the configured state of the element to cause the configured state of the element to correspond to the current state of the element. In one example, the orchestrator device may transmit an alert to a client device indicating an action that the bot has performed or causing the bot to perform an action.

In some implementations, transmitting the one or more instructions includes applying a policy to the element of the network based on the network event. In some implementations, the policy is based on at least one of a location of the element of the network, a type of the element of the network, or a subscription of the element of the network. In some implementations, the policy includes at least one of a security policy, a billing policy, a service policy, or a prioritization policy. In some implementations, transmitting the instruction includes causing the software component to communicate with at least one other software component of the one or more other software components, the at least one other software component performing the network management action in accordance with at least one other logic of the at least one other software component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising: receiving, by a platform as a service (PaaS) orchestrator, a set of values for a set of parameters of a software component template for a software component, the set of values including a set of functions, a logic for a set of workflows, and relationship information for one or more interactions with one or more other software components; generating, by the PaaS orchestrator, the software component using the set of values for the set of parameters; executing, by the PaaS orchestrator, the software component in a sandbox environment, the sandbox environment including a sandbox instance of the one or more other software components; deploying, by the PaaS orchestrator and based on executing the software component in the sandbox environment, the software component in a deployment environment of the PaaS orchestrator; detecting, by the PaaS orchestrator, using the software component, a network event relating to the deployment environment; and transmitting, by the PaaS orchestrator, one or more instructions to cause a network management action, associated with the network event and based on the logic, to be performed.

2. The method of claim 1, wherein detecting the network event comprises:
identifying, by the PaaS orchestrator, a configured state of an element of a network;
detecting, by the PaaS orchestrator, a current state of the element of the network; and
determining, by the PaaS orchestrator, that the current state of the element differs from the configured state of the element.

3. The method of claim 2, wherein transmitting the one or more instructions comprises:
transmitting, by the PaaS orchestrator, the one or more instructions to alter the current state of the element to cause the current state of the element to correspond to the configured state of the element.

4. The method of claim 2, wherein transmitting the one or more instructions comprises:
transmitting, by the PaaS orchestrator, the one or more instructions to alter the configured state of the element to cause the configured state of the element to correspond to the current state of the element.

5. The method of claim 2, wherein transmitting the one or more instructions comprises:
applying, by the PaaS orchestrator, a policy to the element of the network based on the network event.

6. The method of claim 5, wherein the policy is based on at least one of:
a location of the element of the network,
a type of the element of the network, or
a subscription of the element of the network.

7. The method of claim 5, wherein the policy includes at least one of:
a security policy,
a billing policy,
a service policy, or
a prioritization policy.

8. The method of claim 1, wherein transmitting the instruction comprises:
causing, by the PaaS orchestrator, the software component to communicate with at least one other software component of the one or more other software components,
the at least one other software component performing the network management action in accordance with at least one other logic of the at least one other software component.

9. A device, comprising: one or more memories; and one or more processors coupled to the one or more memories, the one or more processors configured to: receive information identifying a new software component, execute the software component in a sandbox environment, the sandbox environment including a sandbox instance of one or more other software components; validate, based on executing the software component in the sandbox environment, the software component for deployment; deploy, based on validating the software component, the software component in a deployment environment; detect, using the software component, and based on deploying the software component, a network event relating to the deployment environment; identify, using the software component, a network management action associated with the network event and based on a logic of the software component; transmit one or more alerts to another software component, of the one or more other software components, to identify the network event and cause the other software component to perform the network management action; store information associated with the network event in a log; and re-train a machine learning model associated with the software component using the log based on storing information associated with the network event in the log.

10. The device of claim 9, wherein the one or more processors are further configured to:

transmit another one or more alerts to one or more client devices to identify at least one of: the network event or the network management action.

11. The device of claim 9, wherein the network management action includes an alteration to one or more resource allocations of the network.

12. The device of claim 9, wherein the network management action includes a change to a logical division of the network.

13. The device of claim 9, wherein the network management action includes a self-organizing network (SON) action.

14. The device of claim 9, wherein the information associated with the network event includes information identifying at least one of:

the network event, the network management action, or a result of the network management action.

15. The device of claim 9, wherein the device is an orchestrator device.

16. A non-transitory computer-readable medium storing a set of instructions, the set of instructions comprising:

one or more instructions that, when executed by one or more processors of a platform as a service (PaaS) orchestrator, cause the PaaS orchestrator to:

receive a set of values for a set of parameters of a software component template for a software component, the set of values including a set of functions, a logic for a set of workflows, and relationship information for one or more interactions with one or more other software components;

generate the software component using the set of values for the set of parameters;

execute the software component in a sandbox environment, the sandbox environment including a sandbox instance of the one or more other software components;

validate, based on executing the software component in the sandbox environment, the software component for deployment;

deploy, based on validating the software component, the software component in a deployment environment of the PaaS orchestrator, the deployment environment being associated with a network;

generate a user interface element identifying a status of a set of software components operating in connection with the network, the set of software components including the software component and the one or more other software components; and provide the user interface element for display via a user interface.

17. The non-transitory computer-readable medium of claim 16, wherein the one or more instructions, when executed by the one or more processors, further cause the PaaS orchestrator to:

receive information identifying an interaction associated with the user interface element; and alter the status of the set of software components based on the interaction associated with the user interface element.

18. The non-transitory computer-readable medium of claim 17, wherein the one or more instructions, when executed by the one or more processors, cause the PaaS orchestrator to:

transmit a command to alter the network in accordance with the logic of the software component.

19. The non-transitory computer-readable medium of claim 18, wherein the one or more instructions, that cause the PaaS orchestrator to transmit the command, cause the PaaS orchestrator to:

transmit the command to alter a current state of a network device of the network, or a configured state of the network device.

20. The non-transitory computer-readable medium of claim 18, wherein the one or more instructions, that cause the PaaS orchestrator to transmit the command, cause the PaaS orchestrator to:

apply a policy to a network device of the network.

* * * * *